July 3, 1934.  S. C. RIEKE  1,965,056
MACHINE FOR CLEANING AND POLISHING FRUIT
Filed Aug. 29, 1933   2 Sheets-Sheet 1
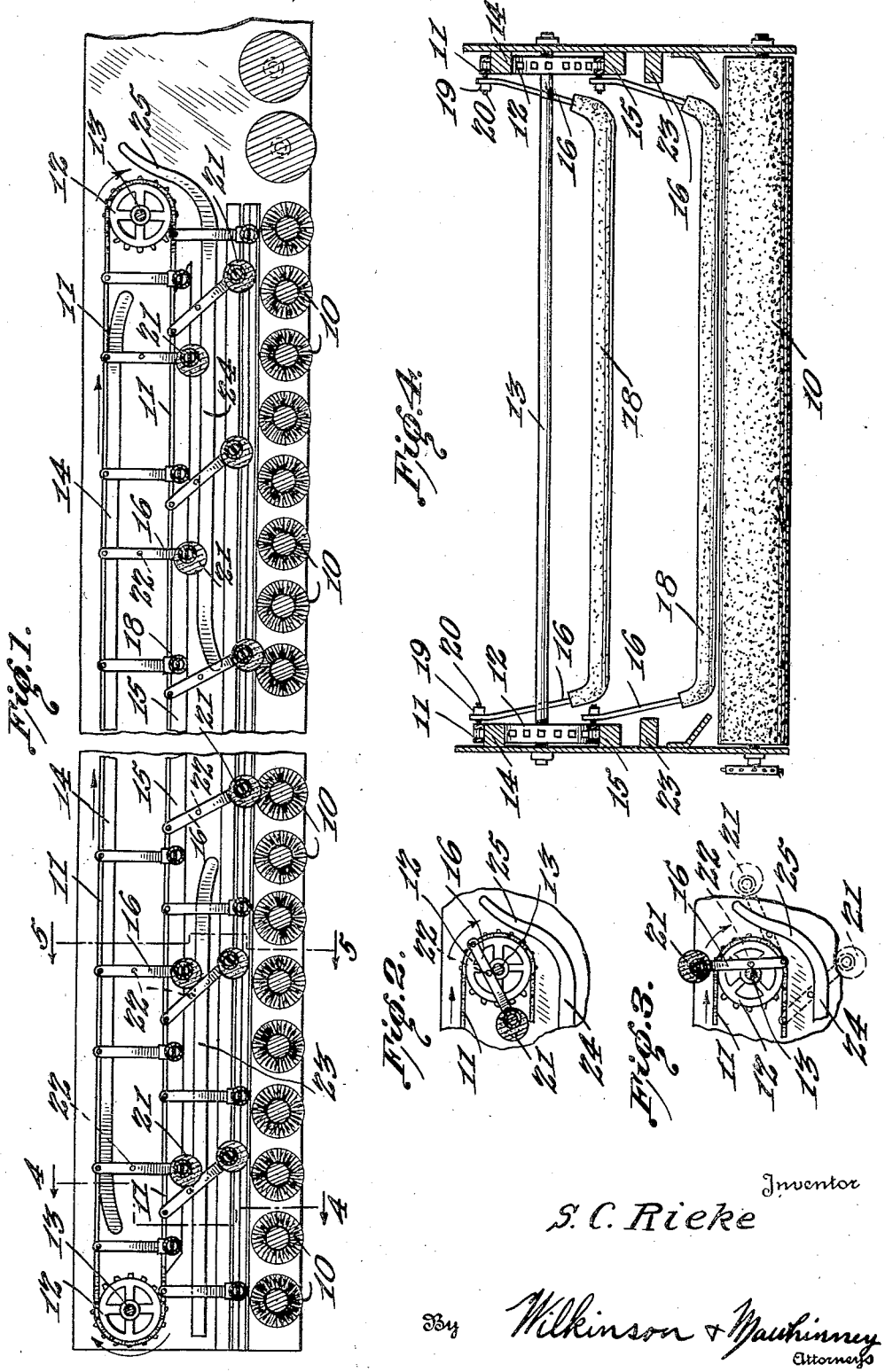
Inventor
S. C. Rieke
By Wilkinson & Mawhinney
Attorneys

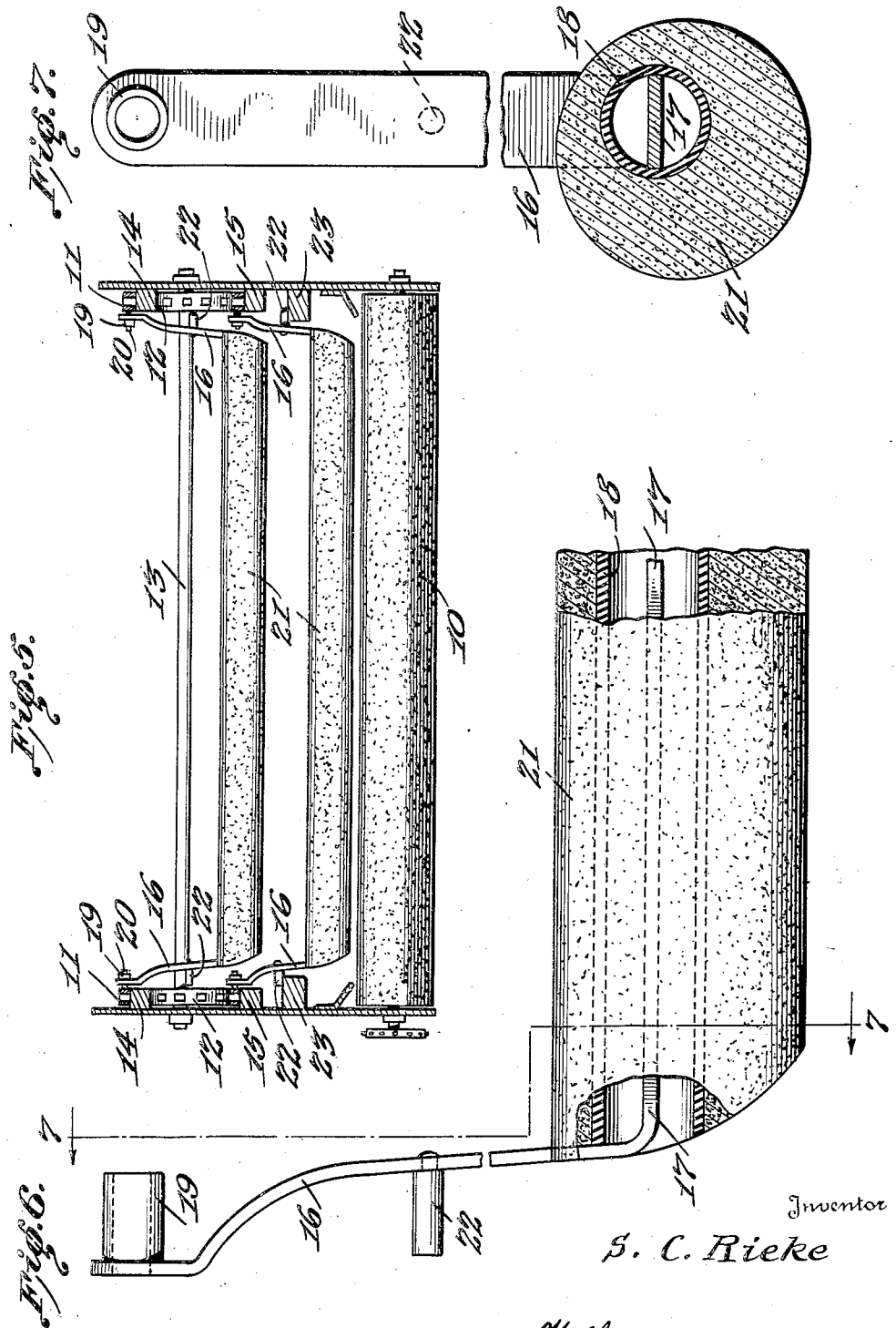

Patented July 3, 1934

1,965,056

UNITED STATES PATENT OFFICE 1,965,056

MACHINE FOR CLEANING AND POLISHING FRUIT

Sidney C. Rieke, Mission, Tex.

Application August 29, 1933, Serial No. 687,353

7 Claims. (Cl. 91—37)

The present invention relates to improvements in applying wax to polishing brushes of fruit cleaning and polishing machines.

The present improvements are illustrated and described in conjunction with the Stebler-Parker machine but this is for the sake of example only and the improvements will be found applicable to other types of machines.

It is an object of the present invention to so modify the boosters of the above named commercial machine that, in addition to their usual functions, they are also employed to carry the wax bodies or masses to the end that the wax may be applied directly to the fruit boosted through the machine by the boosters and also directly to the brushes and indirectly from the brushes to the fruit, it being understood that the boosters not only contact the fruit but also the brushes.

It is a further object of the invention to enable the application of wax without the addition of any new part to the present machine but solely through inexpensive modifications which may be readily made without departing from the original manufacture of the boosters, to convert these boosters to the double function of applying wax both directly to the fruit and indirectly through the brushes to such fruit.

With the foregoing and other objects in view, the invention will be more fully pointed out in the claims appended hereto.

In the drawings, wherein like symbols refer to like or corresponding parts throughout the several views.

Figure 1 is a side view, with parts removed and parts shown in section, of a Stebler-Parker fruit cleaning machine with the invention applied thereto.

Figure 2 is a fragmentary side view showing one of the boosters at the entrance ends of the machine in process of being swung over.

Figure 3 is a similar view showing a still further advanced position of the booster.

Figure 4 is a transverse vertical section taken on the line 4—4 in Figure 1.

Figure 5 is a similar view taken on the line 5—5 also in Figure 1.

Figure 6 is an enlarged fragmentary elevation with parts broken away showing one of the modified boosters, and Figure 7 is a vertical section taken on the line 7—7 in Figure 6.

Referring more particularly to the drawings, 10 designates the revolving polishing cross brushes of a Stebler-Parker fruit cleaning machine over which the fruit is moved by means of boosters. These boosters are moved along by endless chains 11 traveling over sprockets 12 mounted on shafts 13 journaled appropriately in the side walls or other parts of the framework of the machine. The chains are supported and guided as to their upper runs by the chain guides 14 and as to their lower flights by the chain guides 15 attached to the side walls or other parts of the machine, as indicated in Figure 4. The fruit boosters are hung to links of the chains 11 and are free to swing back and forth. These boosters boost the fruit over the revolving cross polishing brushes 10.

The boosters are composed of arms 16 connected at their free lower ends by bars 17. Advantageously the arms 16 and bars 17 may be made in one piece of metal. The bars 17 are usually encased in rubber hose 18 or any similar material to avoid injury to the fruit. At the upper ends of the arms 16, such arms carry bearing sleeves 19 journaled upon the pivot pins 20 which project from the chains 11.

In accordance with the invention the boosters are utilized to carry bodies or masses 21 of wax or some other fruit cleaning or polishing substance. Moreover the arms 16 of the boosters carry pins 22 projecting outwardly therefrom in order to cooperate with pin guide strips 23 and 24.

These pins 22 and pin guide strips 23 and 24 have a lifting action on the boosters whereby to lift the wax out of contact with the brushes 10 when so desired. The pin guide strips 24, at the entrance end of the machine are curved upwardly as indicated at 25 to form booster lowering pin guide strips. The adjacent end portions of the guide strips 23 and 24 are curved downwardly to permit of the lowering and raising of the boosters gradually as the pins 22 move onto and off the guide strips.

In Figure 7 is shown the eccentric wax body 21. In other words this wax is molded eccentrically about the booster and the greatest mass of the wax is preferably forwardly in the direction of motion of the booster.

In the operation of the device, the fruit comes in at the right hand end of the machine onto the brushes 10 and as the boosters are moved along by the endless chains 11 such boosters advance the fruit over the brushes. The brushes 10 of course revolve in alternately opposite directions and the wax bodies 21 may be moved over all or certain of the brushes 10 so as to apply the wax directly thereto, the mass being subsequently applied indirectly from the brushes 10 to the fruit being moved over same. Also the boosters will have the direct action of bringing the wax bodies 21 into direct contact with the fruit which is being boosted by them over the brushes.

All or only certain of the boosters may be equipped with the wax bodies, as indicated in Figure 1. The guide rails 23 and 24 may be placed wherever desired and may be of whatever length required. In the form shown in Figure 1 these rails are at the front and rear parts of the machine so that the pins 22 riding on the rails 24 prevent the wax bodies on the boosters from coming in contact with the brushes 10 at the fore part of the machine. However, in the intermediate part of the machine the guide rails are omitted and as the pins 22 descend off the guide rails 24 the wax bodies 21 swing down by gravity into contact with the brushes 10 and the brushes therefore acquire wax from such bodies 21. As the chains 11 progresses along, the pins 22 come in contact with the cam free ends of the guide rails 23 and have the effect to lift the wax bodies out of contact, and hold such wax bodies out of contact with the brushes 10 at the rear portion of the machine. The pivotal mounting of the booster arms 16 with the chain links enables the boosters to swing about the sprockets and the sprocket shafts 12 so that after passing the rear sprockets the boosters will hang down from the upper flights of the chains until they reach the front sprockets. The sprocket shaft 12 will require that they be swung over at this end also of the machine and in order to prevent same from descending with a blow upon the fruit, the guide lowering strips 25 are provided of such relative curvature with respect to the sprocket shaft as a center that the pins 22 of the swinging boosters will be caught in the upper portion of the rails 25 which are curved at their free ends to receive same and guided gently down the surfaces of such rails 25, the curvature widening gradually downward or in other words being of progressively greater radial distance from the axis of the sprocket shaft 13, whereby the boosters are allowed to descend slowly and without harm to the fruit until the pins are received upon the rails 24. These rails 24 will hold the wax bodies at an elevation above the brushes as heretofore described but low enough to act as boosters for the fruit.

Figures 2 and 3 show the somersaulting action of the boosters in passing about the front sprocket chain and the action of the pins 22 upon the lowering guide strips 25.

The rubber hose may, of course, be omitted from the boosters and the wax applied directly to the metal bars 17; or some other material than hose may be used to encase the bars, for instance some material having a rough exterior to which the wax will attach itself more firmly.

It will be noted that according to the present invention the wax is applied to the brushes from above so that all trash, scale and dirt will fall through the brushes to the floor underneath. In other methods the wax pans and other devices have been placed beneath the brushes in position to catch all the foreign matter and keeping the wax covered with a heavy coating of trash, dirt and scale.

It is obvious that various changes and modifications may be made in the details of construction and design of the above specifically described embodiment of this invention without departing from the spirit thereof, such changes and modifications being restricted only by the scope of the following claims.

What is claimed is:—

1. In a fruit cleaning and polishing machine having rotary cleaning brushes and booster chains, boosters having arms pivoted to said chains with bars connecting the lower portions of the arms, covering for said bars, and masses of polishing substance secured about said coverings.

2. In a fruit cleaning and polishing machine having cleaning and polishing brushes and booster chains, boosters including arms pivoted to said chains and cross bars connecting the lower portions of the chains, rubber hose coverings for said bars, and masses of wax molded about said rubber hose.

3. In a fruit cleaning and polishing machine having cleaning and polishing brushes and booster chains, boosters including arms pivoted to said chains and cross bars connecting the lower portions of the arms, and bodies of plastic wax substance molded eccentrically about said bars with the greatest mass extending forwardly in the direction of movement of the boosters.

4. In a fruit cleaning and polishing machine having brushes and booster chains, boosters having arms pivoted to said chains, wax polishing substance carried by said boosters and adapted to come in contact with the brushes, and guide means for raising the wax substance out of contact with the brushes.

5. In a fruit cleaning and polishing machine having brushes on which the fruit is received and booster chains above the brushes, boosters including arms pivoted to said chains and bars connecting the lower portions of the arms, coverings about said bars, wax bodies eccentrically molded about said coverings with the greatest mass lying forwardly and downwardly in the direction of movement of the boosters, pins projecting laterally from said arms, and fixed guide rails positioned to be engaged by said pins for pivotally lifting the wax bodies out of contact with the brushes.

6. In a fruit cleaning and polishing machine having brushes and booster chains with sprockets, boosters having arms pivoted to said chains, wax bodies supported by the arms and adapted to come in contact with the brushes, guide means for pivotally raising said arms to withdraw the wax bodies from contact with the brushes, and guide means at the entrance end of the machine adjacent said sprockets for slowly and gently lowering the boosters.

7. In a fruit cleaning and polishing machine having brushes and booster chains with sprockets, boosters having arms pivoted to said chains, pins projecting from said arms, guide rails fixed in the machine below the lower flights of the chains for engaging said pins to pivotally lift the arms, wax bodies supported by said arms and adapted to contact with the brushes except when raised by the engagement of the pins with the guide rails, and curved guide rails fixed at the entrance end portion of the machine adjacent said sprockets for receiving the pins as the boosters somersault when moving from the upper to the lower flights of the chains whereby to gently and slowly lower the wax bodies into contact with the fruit.

SIDNEY C. RIEKE.